(12) United States Patent
Sugiura et al.

(10) Patent No.: US 7,356,211 B2
(45) Date of Patent: Apr. 8, 2008

(54) LIGHTING SYSTEM

(75) Inventors: Takuro Sugiura, Fukushima-ken (JP); Hideaki Nagakubo, Fukushima-ken (JP)

(73) Assignee: Alps Electric Co., Ltd, Tokyo (JP)

( * ) Notice: Subject to any disclaimer, the term of this patent is extended or adjusted under 35 U.S.C. 154(b) by 0 days.

(21) Appl. No.: 11/554,458

(22) Filed: Oct. 30, 2006

(65) Prior Publication Data

US 2007/0104415 A1 May 10, 2007

(30) Foreign Application Priority Data

Nov. 4, 2005 (JP) ............................. 2005-321067

(51) Int. Cl.
*G02B 6/12* (2006.01)

(52) U.S. Cl. .................. 385/14; 385/901; 359/237; 359/376; 359/377; 359/462; 359/463; 359/454; 359/455; 359/456; 359/458; 359/477

(58) Field of Classification Search .............. 349/15, 349/61, 62, 66; 359/237, 462, 376, 377, 359/454–458, 463, 477; 385/14, 115–120, 385/900, 901

See application file for complete search history.

(56) References Cited

U.S. PATENT DOCUMENTS

| | | | | |
|---|---|---|---|---|
| 5,600,462 A * | 2/1997 | Suzuki et al. ............... 349/112 |
| 5,724,108 A * | 3/1998 | Shibata ........................ 349/62 |
| 6,474,827 B2 * | 11/2002 | Shinohara et al. .......... 362/607 |
| 6,724,535 B1 * | 4/2004 | Clabburn .................... 359/619 |
| 6,846,089 B2 * | 1/2005 | Stevenson et al. .......... 362/627 |
| 7,088,509 B2 * | 8/2006 | Peterson et al. ............. 359/457 |
| 2007/0064294 A1 * | 3/2007 | Hoshino et al. ............. 359/237 |

FOREIGN PATENT DOCUMENTS

JP  2004-325179  11/2004

* cited by examiner

*Primary Examiner*—Frank G. Font
*Assistant Examiner*—Hung Lam
(74) *Attorney, Agent, or Firm*—Brinks Hofer Gilson & Lione

(57) ABSTRACT

A stereoscopic display device is provided. The stereoscopic display device includes an optical waveguide member and a first main surface and a second main surface. The first and second main surfaces face each other. A first light path changing member is provided on at least one of the first and second main surfaces, and is operative to change the path of light guided by the optical waveguide member. A second light path changing member is provided on at least one of the first and second main surfaces, and is operative to change the path of the light guided by the optical waveguide member. A reflector body is disposed so as to face the second main surface and reflects the light emitted from the second light path changing member to the first main surface.

20 Claims, 11 Drawing Sheets

| EMISSION ANGLE (PEAK) | θ2 |
|---|---|
| 0 | 45 |
| 4 | 43 |
| 8 | 41 |
| 11 | 40 |
| 12 | 39 |
| 17 | 38 |
| 20 | 37 |
| 22 | 36 |
| 28 | 35 |

FIG. 10

| ANGLE (°) | PRISM ANGLE | | |
|---|---|---|---|
| | θ2=40° | θ2=35° | θ2=33° |
| 0 | 39 | 14 | 8 |
| 5 | 200 | 18 | 15 |
| 10 | 252 | 40 | 20 |
| 15 | 245 | 117 | 41 |
| 20 | 194 | 191 | 121 |
| 25 | 107 | 260 | 198 |
| 30 | 63 | 252 | 257 |
| 35 | 38 | 182 | 265 |
| 40 | 30 | 97 | 205 |
| 45 | 29 | 54 | 110 |

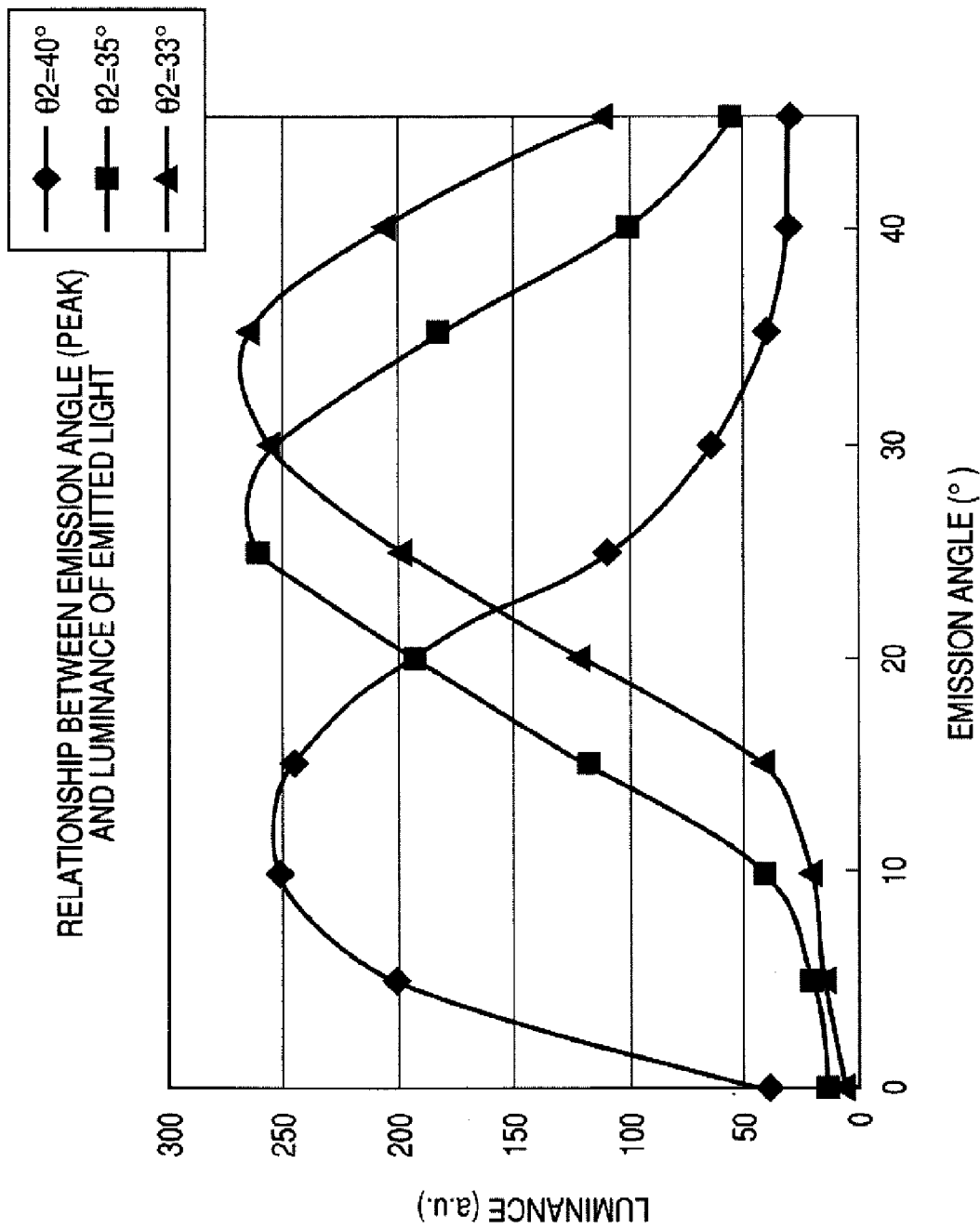

LIGHTING SYSTEM

This patent document claims the benefit of Japanese Patent Application 2005-321067 filed on Nov. 4, 2005, which is hereby incorporated by reference.

BACKGROUND

1. Field

The present embodiments relate to a stereoscopic display device.

2. Related Art

An optical waveguide member has come into widespread use for various purposes. For example, the optical waveguide member is used to a backlight unit or a front light unit known as an illuminating unit of a liquid crystal display device. In general, the front light unit is mainly provided with a light source, an optical waveguide (optical waveguide member) that transmits light emitted from the light source to a liquid crystal display panel, and a prism that efficiently supplies light from the optical waveguide to the liquid crystal display panel.

The optical waveguide has a flat shape, and has a pair of main surfaces opposite to each other and a pair of end surfaces opposite to each other. In this case, the liquid crystal display panel is disposed on one main surface, and the light source is disposed in the vicinity of one end surface. In addition, a reflecting film is disposed on the other main surface and reflects light emitted from the light source.

Conventionally, uneven portions (prisms) having various shapes were formed on the main surface of the optical waveguide such that the optical waveguide has a light emitting display function. For example, a display device for a vehicle using an optical waveguide as a light emitting display device is disclosed in JP-A-2004-325179.

The display device for a vehicle is provided with a first display design portion and a second display design portion on one main surface of the optical waveguide which forms dial plates. The first display design portion has an uneven shape and emits light by reflecting light emitted from a first light source to form, for example, the image of a speedometer, and the second display design plate has an uneven shape and emits light by reflecting light emitted from a second light source to form an image, such as characters. The first display design portion emits light by turning on the first light source, and the second display design portion emits light by turning on the second light source.

The display device disclosed in JP-A-2004-325179 directly emits light from the prism toward a viewer. Therefore, two-dimensional display is performed, and the design property is insufficient.

SUMMARY

The exemplary embodiments may obviate one or more of the disadvantages created by one or more of the limitations or draw backs of the related art. For example, in one embodiment, a stereoscopic display device can conduct stereoscopic display having a sufficient design property by using an optical waveguide member.

In one embodiment, a stereoscopic display device includes an optical waveguide member has an end surface on which light emitted from a light source is incident and first and second main surfaces that face each other. A first light path changing member is provided on at least one of the first and second main surfaces of the optical waveguide member and changes the path of light guided by the optical waveguide member so as to travel toward the first main surface. A second light path changing member is provided on at least one of the first and second main surfaces of the optical waveguide member and changes the path of the light guided by the optical waveguide member so as to travel toward the second main surface. A reflector body is disposed so as to face the second main surface and reflects the light emitted from the second light path changing member to the first main surface.

In one embodiment, when the light source is turned on, the path of light from the light source is changed so as to travel toward the second main surface by the second light path changing member of the optical waveguide member, and is also changed so as to travel toward the first main surface by the first light path changing member. In this embodiment, the light that is emitted from the first main surface by the first light path changing member is visible by the viewer as a real image S formed by light emitted in the shape of the first light path changing member. For example, light whose path is changed by the second light path changing member travels toward the second main surface and is reflected toward the first main surface by the reflector body. Light is visible by the viewer as a virtual image that appears on the reflector body. Accordingly, the viewer can see the stereoscopic image in which the shape (real image) of the first light path changing member emerges from the shape (virtual image) of the second light path changing member. In this embodiment, it is possible to realize a light emitting display having an abundant design property.

In one embodiment, the light source and the optical waveguide member are not limited to one. It is possible to realize various shapes of light emitting displays by various combinations of a plurality of light sources or optical waveguide members.

In one embodiment, that the first light path changing member is provided on the first main surface and includes a light diffusing part that diffuses the light guided by the optical waveguide member, and for example, the second light path changing member is provided on the first main surface and includes a prism that changes the path of the light guided by the optical waveguide member so as to travel toward the second main surface.

In one embodiment, the first light path changing member is provided on the second main surface and includes a light diffusing part that diffuses the light guided by the optical waveguide member, and for example, the second light path changing member is provided on the second main surface and includes a prism that changes the path of the light guided by the optical waveguide member so as to travel to the second main surface. In one embodiment, the prism or the light diffusing part serves as the second light path changing member is not provided on the first main surface 1c exposed to the outside as an emission surface (the prism or the light diffusing part is provided on only the second main surface that is not exposed to the outside). In this embodiment, it is possible to protect the light path changing member from, for example, exterior stress.

In one embodiment, the first light path changing members is provided on both the first and second main surfaces and includes light diffusing parts that diffuse the light guided by the optical waveguide member, and for example, the second light path changing members are provided on both the first and second main surfaces and include prisms that change the path of the light guided by the optical waveguide member so as to travel toward the second main surface. Since light is emitted from four different layers, the design property is dramatically improved.

In one embodiment, the first light path changing member is provided on the second main surface and includes a prism that changes the path of the light guided by the optical waveguide member so as to travel toward the first main surface, and for example, the second light path changing member is provided on the first main surface and includes a prism that changes the path of the light guided by the optical waveguide member so as to travel to the second main surface. Since the light diffusing part is not provided, the optical waveguide member is entirely transparent when light is not emitted, and the design property is improved.

In one embodiment, the prism has an uneven portion composed of a substantially scalene triangle having as two sides a first sloped surface that is slanted at a first angle with respect to the main surface and a second sloped surface that is slanted at a second angle with respect to the main surface, and for example, the second angle is larger than the first angle. In one embodiment, the path of the light emitted from the light source is changed by the second sloped surface of the prism.

In one embodiment, the prism can effectively guide light emitted from the light source into the optical waveguide by the first sloped surface thereof, and effectively change the path of the guided light by the second sloped surface thereof. The prism can transmit light substantially in a normal direction by the first sloped surface, which makes it possible to easily and reliably display an image formed by light emitted from a complicated and minute prism.

In one embodiment, emission angle of light is reflected by the reflector body and emitted from the first main surface with respect to the first main surface be controlled by the second angle of the second sloped surface. In this embodiment, it is possible to change the emission angle of light by only changing the slope angle of the second sloped surface, and to easily adjust the stereoscopic effect or the luminance.

In one embodiment, the emission angle is set in a range of about 5° to 45°. In this embodiment, it is possible to obtain a sufficient stereoscopic effect and to improve the visibility of a light emitting display.

In one embodiment, the second angle of the second sloped surface is set in a range of about 33° to 43°. In this embodiment, it is possible to realize an emission angle at which high visibility and a sufficient stereoscopic effect are obtained.

In one embodiment, the first sloped surface of the prism is slanted at an angle capable of transmitting light reflected from the reflector body. The first sloped surface reliably transmits light substantially in the normal direction. Therefore, even when light emitted from the prism is re-reflected toward the prism by the reflector body, it is possible to prevent the light emitting performance of the prism from being influenced by the prism. Accordingly, it is possible to easily and reliably display an image formed by light emitted from a complicated and minute prism.

In one embodiment, it is preferable that the light diffusing part is formed by providing grooves or protrusions on the main surface, or by processing a part of the first main surface as a pear-skin surface. In one embodiment, the light diffusing part can be easily formed on the main first surface of the optical waveguide, which makes it possible to effectively and uniformly diffuse light.

BRIEF DESCRIPTION OF THE DRAWINGS

FIG. 10 is a table indicating a relationship between the emission angle θ and a luminance of an emitted light at a predetermined angle of the steeply sloped surface;

FIG. 11 is a graph showing the relationship between the emission angle θ and the luminance of emitted light at a predetermined angle of the steeply sloped surface;

DETAILED DESCRIPTION

Figure 1A:
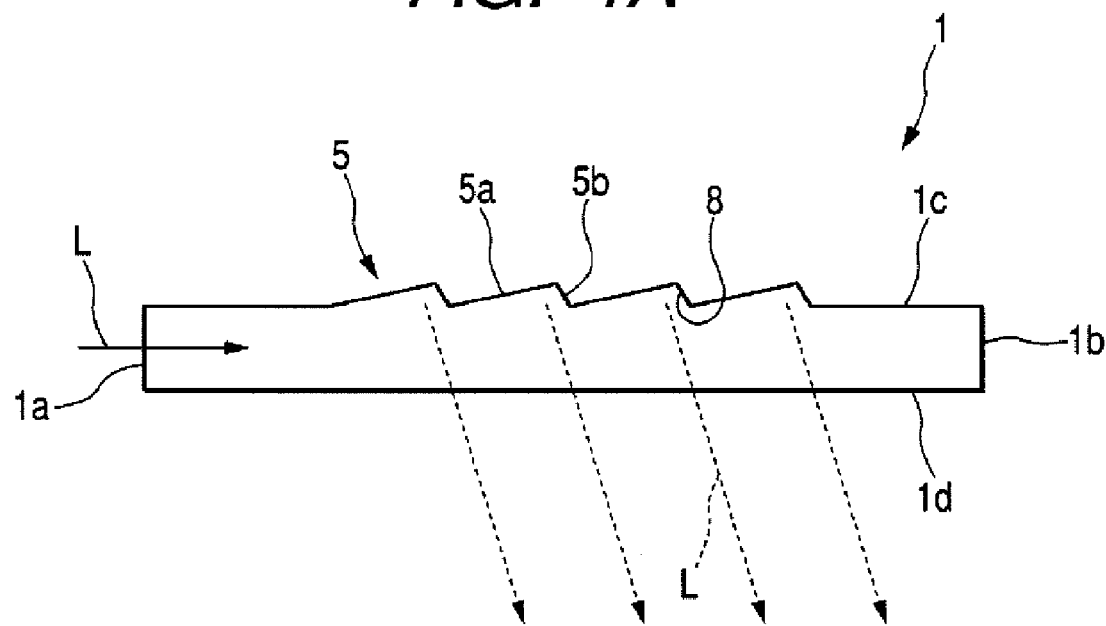
FIG. 1A is a cross-sectional view of the optical waveguide according to one embodiment.
Figure 1B:
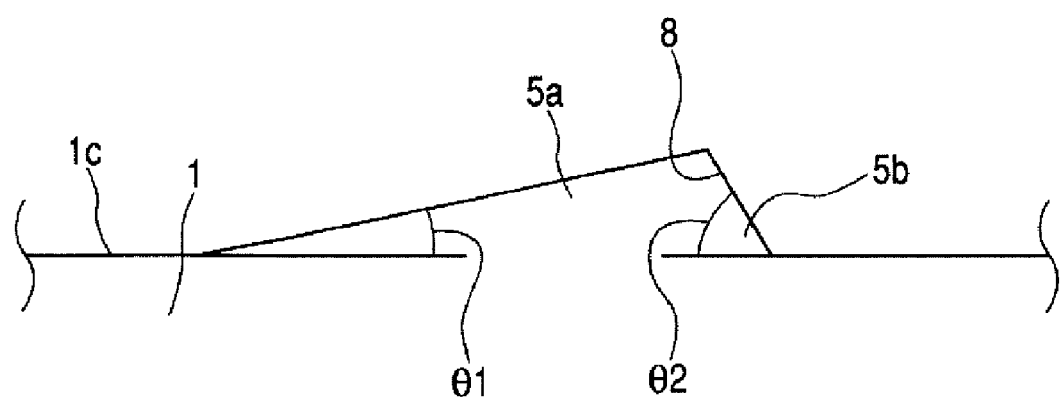
FIG. 1B is an enlarged view of a prism formed on the optical waveguide according to one embodiment.

In one embodiment, as shown in FIGS. 1A and 1B, an optical waveguide 1, serving as an optical waveguide member forming a stereoscopic display device according to an embodiment of the invention, is formed of a transparent material (light transmissive material). The optical waveguide 1 includes a pair of end surfaces 1a and 1b (a first end surface 1a receives light L in FIG. 1A) that can receive the light L emitted from a light source (not shown) and a pair of first and second main surfaces 1c and 1d that are arranged perpendicular to the end surfaces 1a and 1b and face each other.

A prism 5 is formed on the first main surface 1c of the optical waveguide 1. The prism 5 serves as a light path changing member that is formed of an uneven portion having a predetermined shape. The prism 5 changes the path of the light L that is emitted from the light source and guided by the optical waveguide 1 so as to travel toward the second main surface 1d. As shown in FIG. 1B, the prism 5 is formed in the shape of a substantially scalene triangle having as two sides a sharply sloped surface 5a, serving as a first sloped surface that slopes at a predetermined first angle of θ1 relative to the first main surface 1c, and a steeply sloped surface 5b, serving as a second sloped surface that slopes at a second angle of θ2 relative to the first main surface 1c.

The second angle θ2 is larger than the first angle θ1. In one embodiment, the prism 5 receives the light L that is emitted from the light source and guided by the optical waveguide 1 to an acceptance surface 8 of the steeply sloped surface 5b and converts the light L so as to travels toward only the second main surface 1d. In this embodiment, the acceptance surface 8 of the steeply sloped surface 5b is directed to the first end surface 1a at which the light source is positioned. The acceptance surface 8 can change the path of the light L that is emitted from the light source and is then incident on the first main surface 1a such that light can be efficiently emitted to the second main surface 1d. In addition, the slope angle θ1 of the slightly sloped surface 5a is set to an angle (for example, an angular range of about 0.5° to 5°) at which light can pass substantially in a normal direction (a direction substantially perpendicular to the main surfaces 1c and 1d). The optical waveguide 1 having the prisms 5 may be formed by, for example, injection molding.

Figure 2:
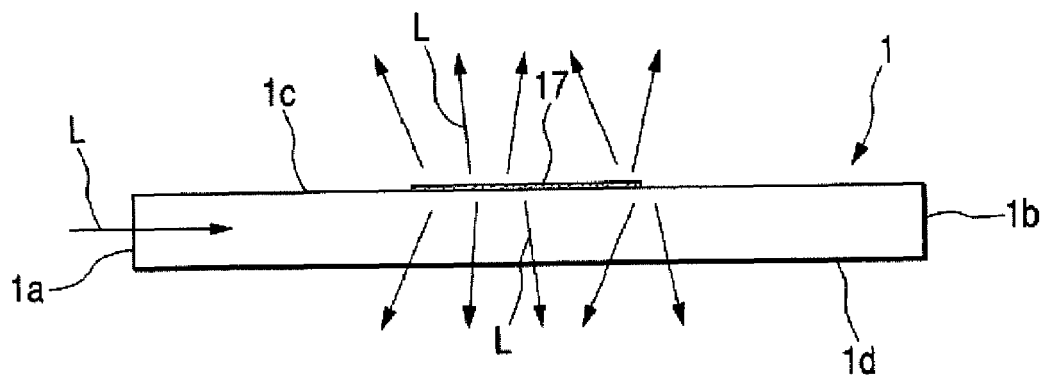
FIG. 2 is a view illustrating the scattered state of light when a light diffusing part is provided on the optical waveguide.
Figure 3A:
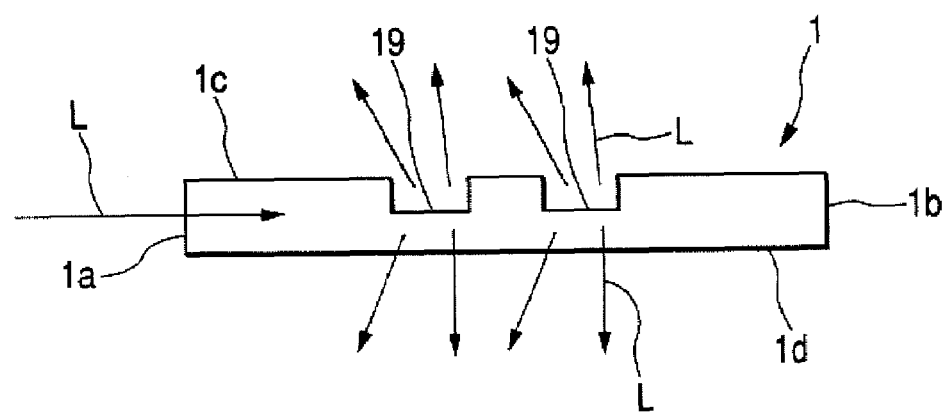
FIG. 3A is a cross-sectional view illustrating the light diffusing part having grooves according to one embodiment.
Figure 3B:
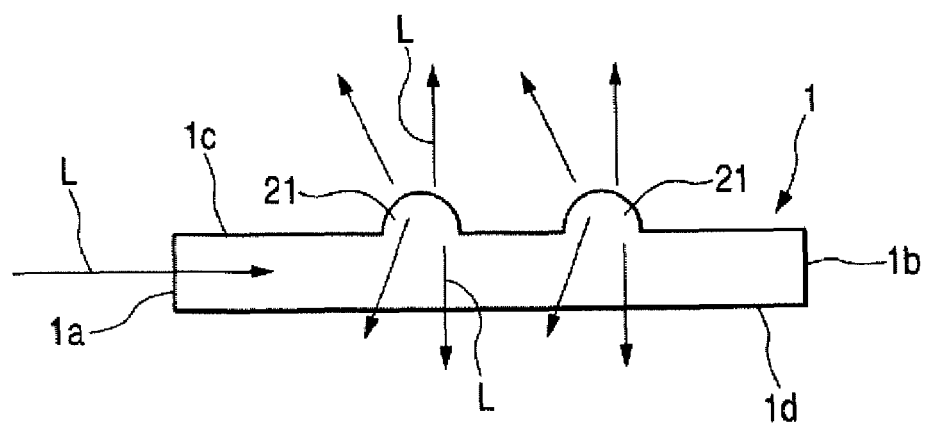
FIG. 3B is a cross-sectional view of the light diffusing part having protrusions according to one embodiment.

As shown in FIG. 2, a light diffusing part 17, serving as a light path changing member, is provided on the first main surface 1c of the optical waveguide 1 in regions other than the forming region of the prisms 5. The light diffusing part 17 is formed in a predetermined shape on the first main surface 1c of the optical waveguide 1. For example, the light diffusing part 17 is formed of grooves 19 shown in FIG. 3A or protrusions 21 shown in FIG. 3B. Alternatively, the light diffusing part 17 is formed by processing a part of the first main surface as a pear-skin surface. In one embodiment, the light diffusing part 17 diffuses the light L that is emitted from the light source and guided by the optical waveguide 1 toward the first and second main surfaces 1c and 1d.

Figure 4A:
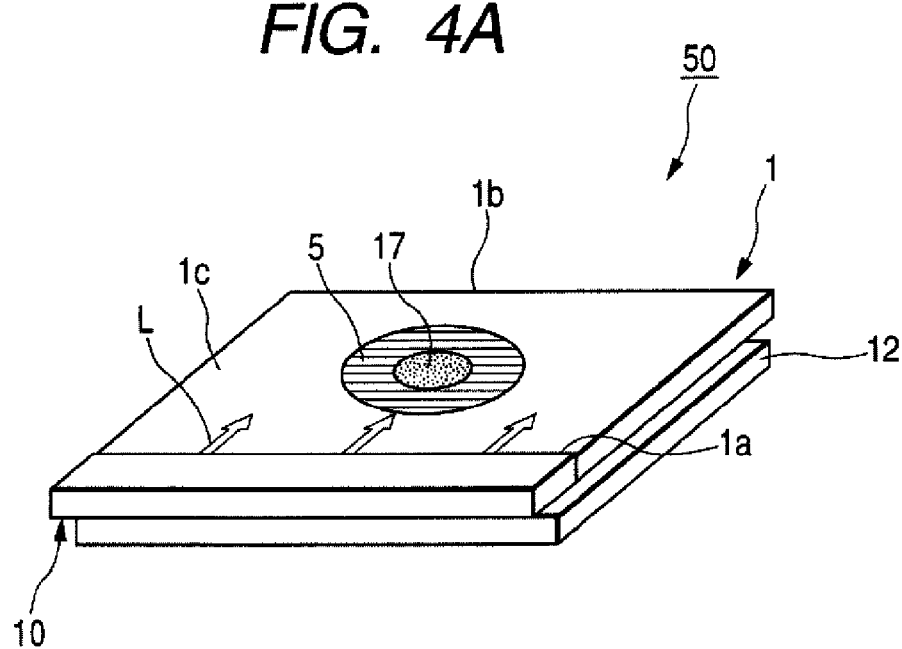
FIG. 4A is a perspective view illustrating a stereoscopic display device according to a first embodiment.
Figure 4B:
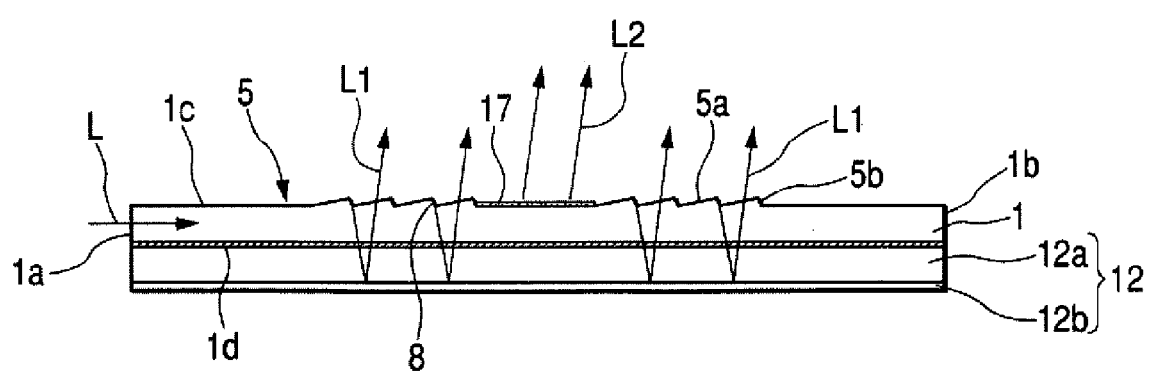
FIG. 4B is a cross-sectional view of the stereoscopic display device of FIG. 4A.

FIGS. 4A and 4B show a stereoscopic display device 50 having the constituent elements of FIGS. 1A to 3B according to a first embodiment. As shown in FIGS. 4A and 4B, the stereoscopic display device 50 according to the first embodiment includes the optical waveguide 1, a light source 10 disposed so as to face the first end surface 1a of the optical waveguide 1, and a reflector body 12 that is disposed so as to face the second main surface 1d and reflects light reflected from the prism 5 toward the first main surface 1c. The light source 10 may include a bar-shaped optical waveguide disposed along the first end surface 1a of the optical waveguide 1 and LEDs that are disposed at both ends of the bar-shaped optical waveguide and emit light of at least one color. The reflector body 12 includes a transparent member 12a disposed such that the upper surface thereof faces the second main surface 1d of the optical waveguide 1 and a reflective film 12b provided at the lower side of the transparent member 12a.

A circular-shaped light diffusing part 17, serving as a first light path changing member, is formed at the center of the first main surface 1c of the optical waveguide 1. An annular-shaped prism 5, serving as a second light path changing member, is concentrically formed on the first main surface 1c so as to surround the entire circumference of the light diffusing part 17. The acceptance surface 8 of the steeply sloped surface 5b of the prism 5 faces the first end surface 1a, and the slightly sloped surface 5a of the prism 5 is slanted at an angle that can transmit light reflected from the reflector body 12.

In the stereoscopic display device 50 according to the first embodiment, when the light source 10 is turned on, the path of the light L emitted from the light source 10 is changed by the acceptance surface 8 of the steeply sloped surface 5b of the prism 5 formed on the first main surface 1c of the optical waveguide 1, and the light L is diffused toward the first and second main surfaces 1c and 1d by the light diffusing part 17. The light L1 whose path is changed by the acceptance surface 8 of the steeply sloped surface 5b of the prism 5 travels to the second main surface 1d and is reflected by the reflective film 12b of the reflector body 12. The light L1 passes through the slightly sloped surface 5a of the prism 5 and is emitted from the first main surface 1c. Light L2 diffused and reflected toward the first main surface 1c by the light diffusing part 17 is emitted from the first main surface 1c without any interference with the reflected light L1.

Figure 5A:
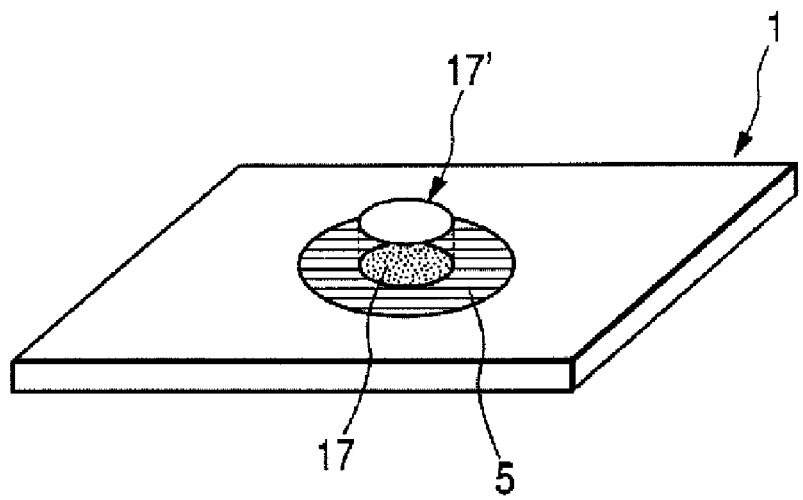
FIG. 5A is a perspective view schematically showing a stereoscopic image obtained by the stereoscopic display device of FIGS. 4A and 4B; .
Figure 5B:
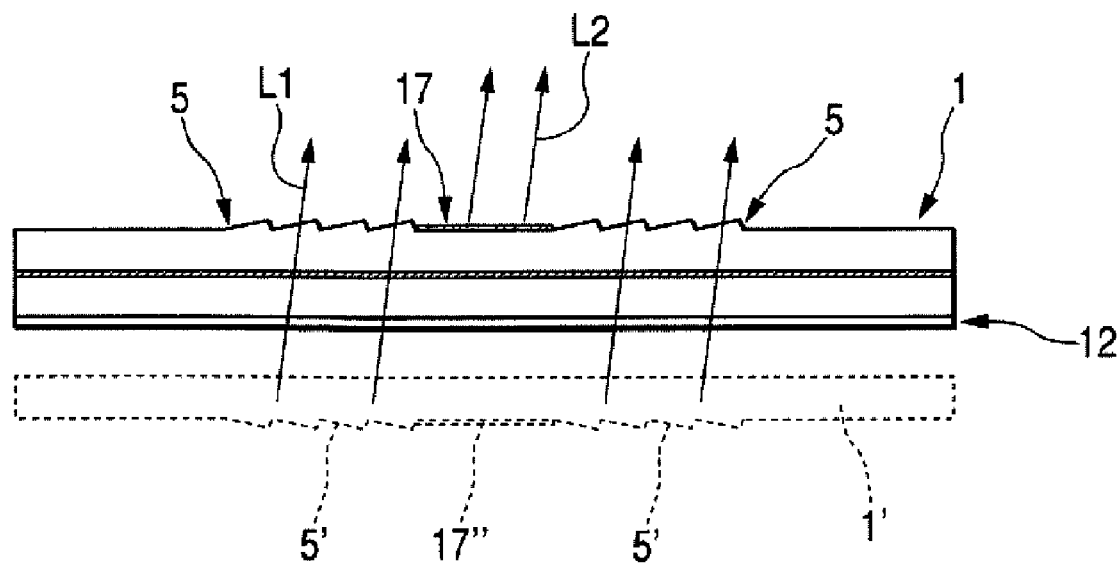
FIG. 5B is a view showing the reflected and diffused states of light in the stereoscopic display device of FIGS. 4A and 4B.

As shown in FIGS. 5A and 5B, the light L2 that is diffused toward the first main surface 1c by the light diffusing part 17 and emitted from the first main surface 1c is visible by the viewer as a real image formed by light emitted in the circular shape by the light diffusing part 17. The light L1 whose path is changed by the prism 5 travels toward the second main surface 1d and is reflected toward the first main surface 1c by the reflector body 12. The light L1 is visible by the viewer as a virtual image 5' (a part of a virtual image 1' of the optical waveguide 1) that appears on the reflector body 12. The viewer can see the stereoscopic image in which the circular shape (real image 17') of the light diffusing part 17 emerges from the annular shape (virtual image 5') of the prism 5 (see FIG. 5A).

In FIG. 5B, numeral reference 17" is a part of the virtual images 1' of the optical waveguide 1, and is a virtual image of the light diffusing part 17 obtained by focusing light that is diffused toward the second main surface 1d by the light diffusing part 17. The prism 5 and the light diffusing part 17 are formed in geometric shapes such as a circular or annular shape, but the prism 5 and the light diffusing part 17 are formed in a predetermined shape, such as an alphabet or numeric character, according to the purposes thereof without being limited to graphics.

Figure 6A:
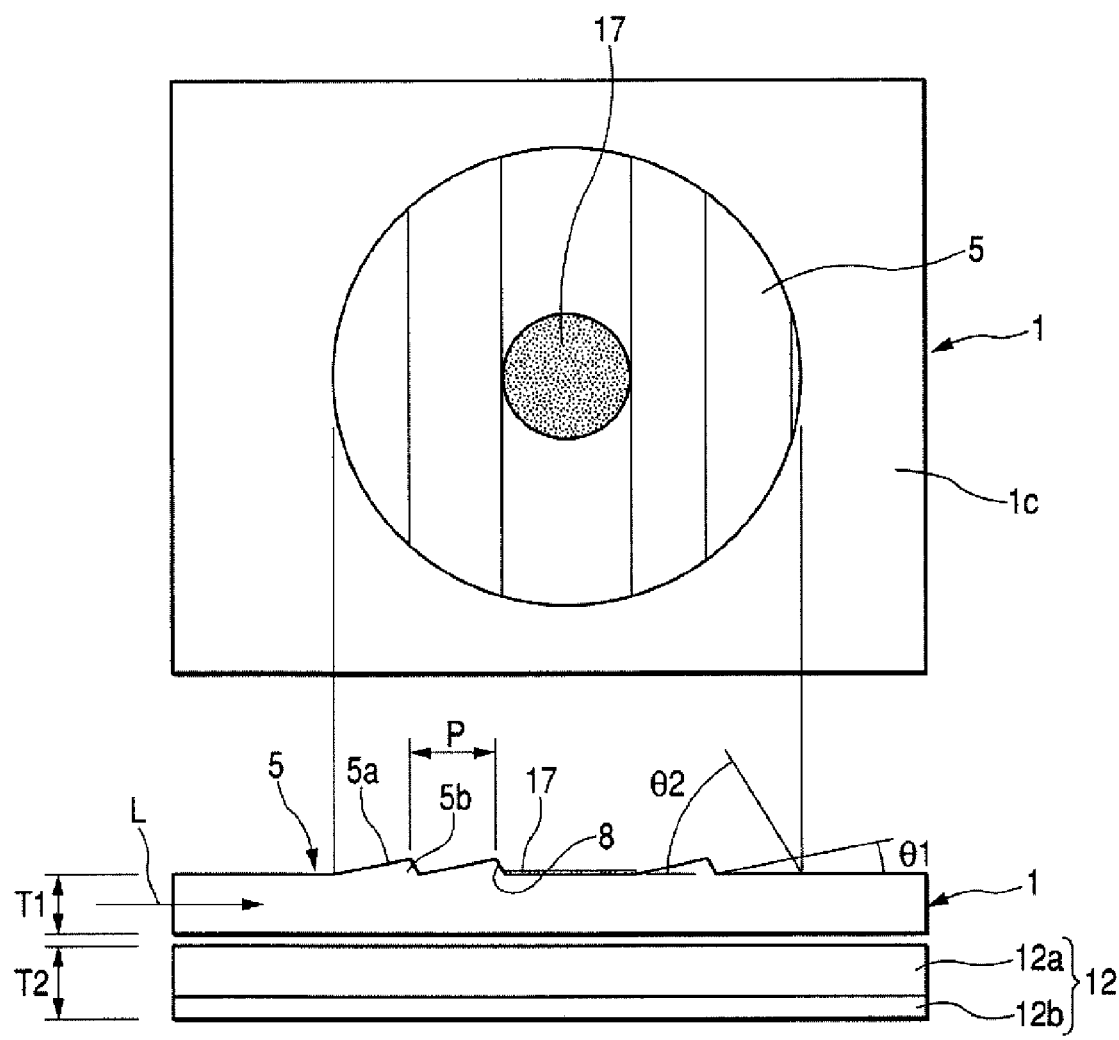
FIG. 6A is a schematic view showing an example of the stereoscopic display device of FIGS. 4A and 4B to which concrete dimensions are set.
Figure 6B:
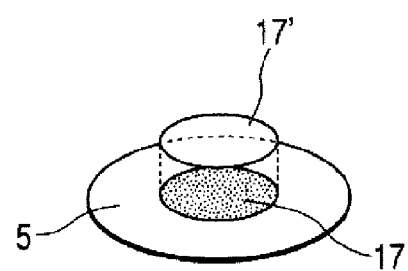
FIG. 6B is a perspective view showing a stereoscopic display in which a real image of the light diffusing part emerges from a virtual image of the prism.

In the stereoscopic display as described above in some of the exemplary embodiments, optical characteristics, such as a stereoscopic effect or luminance, are affected by the shapes of the prism 5 or the light diffusing part 17, the thickness of the optical waveguide 1 or the reflector body 12, and the like. FIGS. 6A and 6B show concrete examples of the dimensions of various constituent elements in the above-mentioned embodiment of the invention. For example, a pitch P between the scalene triangles of the prisms 5 is set to 416.7 μm, the slope angle (first angle) θ1 of the slightly sloped surface 5a is set to 2.5°, and the slope angle (second angle) θ2 of the steeply sloped surface 5b is set to 35°. The thickness T1 of the optical waveguide 1 is set to 0.8 mm, and the thickness T2 of the transparent member 12a of the reflector body 12 is set to 2.0 mm, With the dimensions set as described above, for example, it is possible to obtain a sufficient stereoscopic effect and good visibility.

In one exemplary embodiment, by experiments that a preferred range of observation angle, for example, an emission angle θ (see FIG. 7; an angle between the light L emitted from the first main surface 1c and a normal line O) is 5° to 45°. If the emission angle θ is in the range of 5° to 45°, it is possible to easily obtain the stereoscopic effect in viewing, and the visibility of the stereoscopic display is good.

Figures 7, 8:
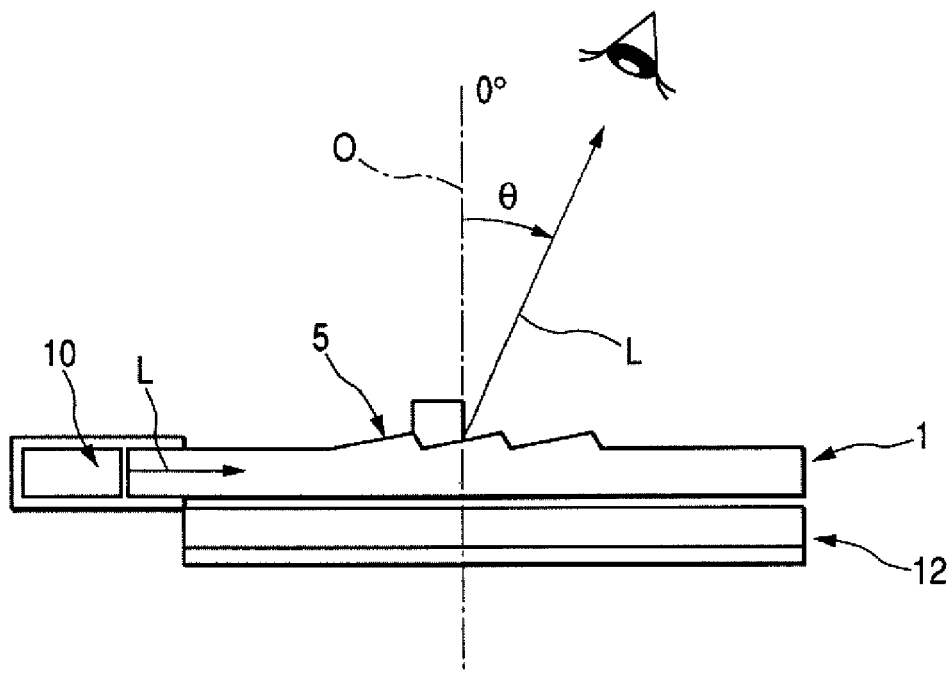
FIG. 7 is a cross-sectional view showing light emitted from a first main surface of the optical waveguide.
FIG. 8 is a table indicating the relationship between an emission angle θ and a slope angle θ2 of a steeply sloped surface.
Figure 9:
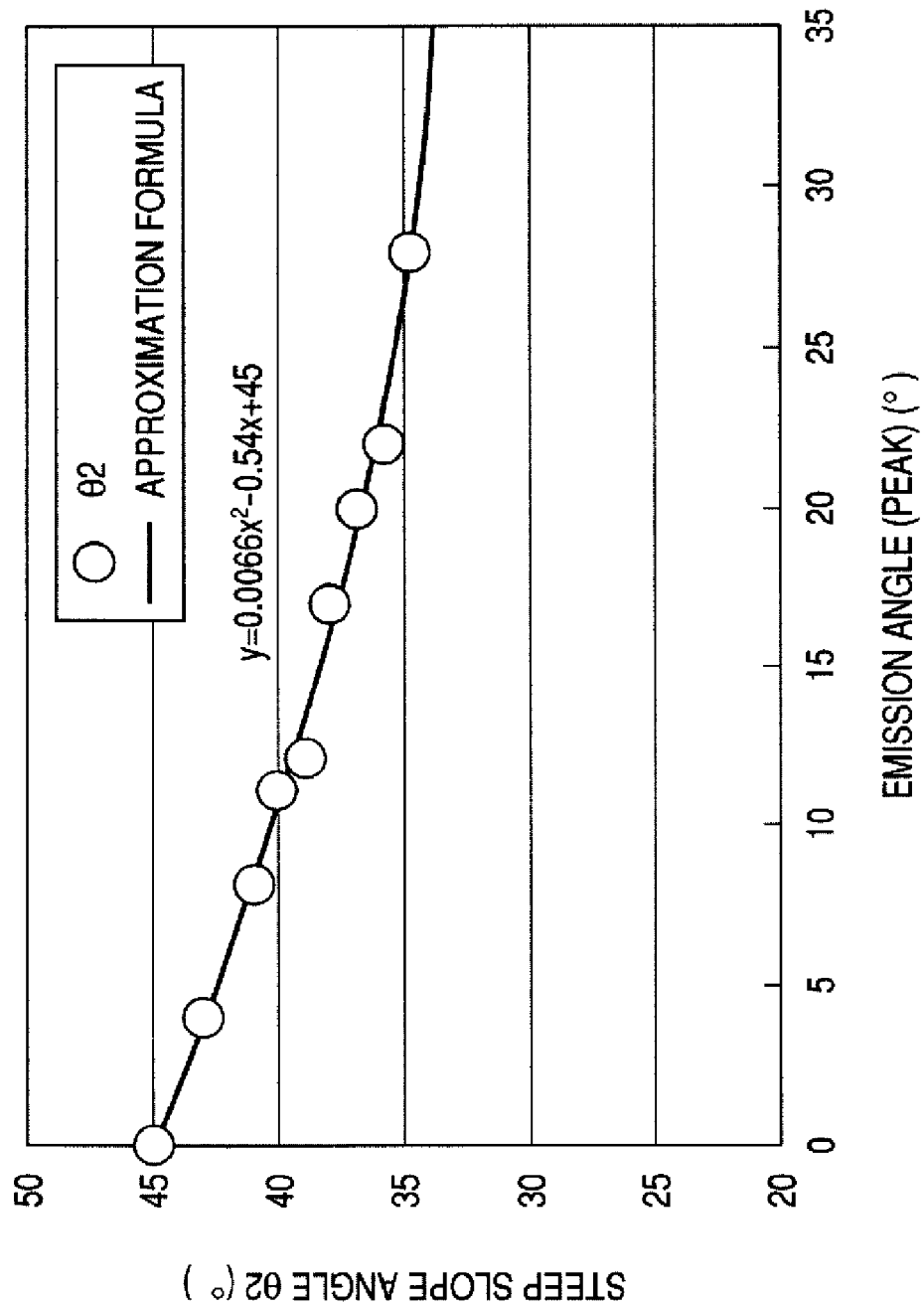
FIG. 9 is a graph showing the relationship between the emission angle θ and the slope angle θ2 of the steeply sloped surface.

The emission angle θ of the light L that is reflected from the prism 5 by the reflector body 12 and emitted from the first main surface 1c is controlled by the slope angle θ2 (second angle) of the steeply sloped surface 5b. FIG. 8 is a table indicating the relationship between the emission angle θ and the slope angle θ2 of the steeply sloped surface 5b. FIG. 9 is a graph showing the relationship between the emission angle θ and the slope angle θ2 of the steeply sloped surface 5b. In at least one embodiment, as shown in FIGS. 8 and 9, the relationship between the emission angle θ and the slope angle θ2 of the steeply sloped surface 5b can be represented as the following approximation formula: $y=0.0066X^2-0.54X+45$ (where X is the emission angle θ, and y is a slope angle θ2). In order to set the emission angle θ in the range of 5° to 45°, it is preferable to set the slope angle θ2 of the steeply sloped surface 5b in the range of 33° to 43°. The approximation formula or the setting range of the angle is changed by design parameters.

FIG. 10 is a table indicating the relationship between the emission angle θ and the luminance of the emission light at a predetermined slope angle θ2 (=40°, 35°, and 33°) of the steeply sloped surface 5b. FIG. 11 is a graph showing the relationship between the emission angle θ and the luminance of the emission light at a predetermined slope angle θ2 (=40°, 35°, and 33°) of the steeply sloped surface 5b. For example, when the slope angle θ2 of the steeply sloped surface 5b is 40°, the highest luminance is obtained at the emission angle θ of about 10°. In another example, when the slope angle θ2 of the steeply sloped surface 5b is 35°, the highest luminance is obtained at the emission angle θ of about 25°. In yet another example, when the slope angle θ2 of the steeply sloped surface 5b is 33°, the highest luminance is obtained at the emission angle θ of about 35°. For example, when the slope angle θ2 of the steeply sloped surface 5b is large, the highest luminance is obtained at a large emission angle θ, and when the slope angle θ2 of the steeply sloped surface 5b is small, the highest luminance is obtained at a small emission angle θ.

Figure 12A:
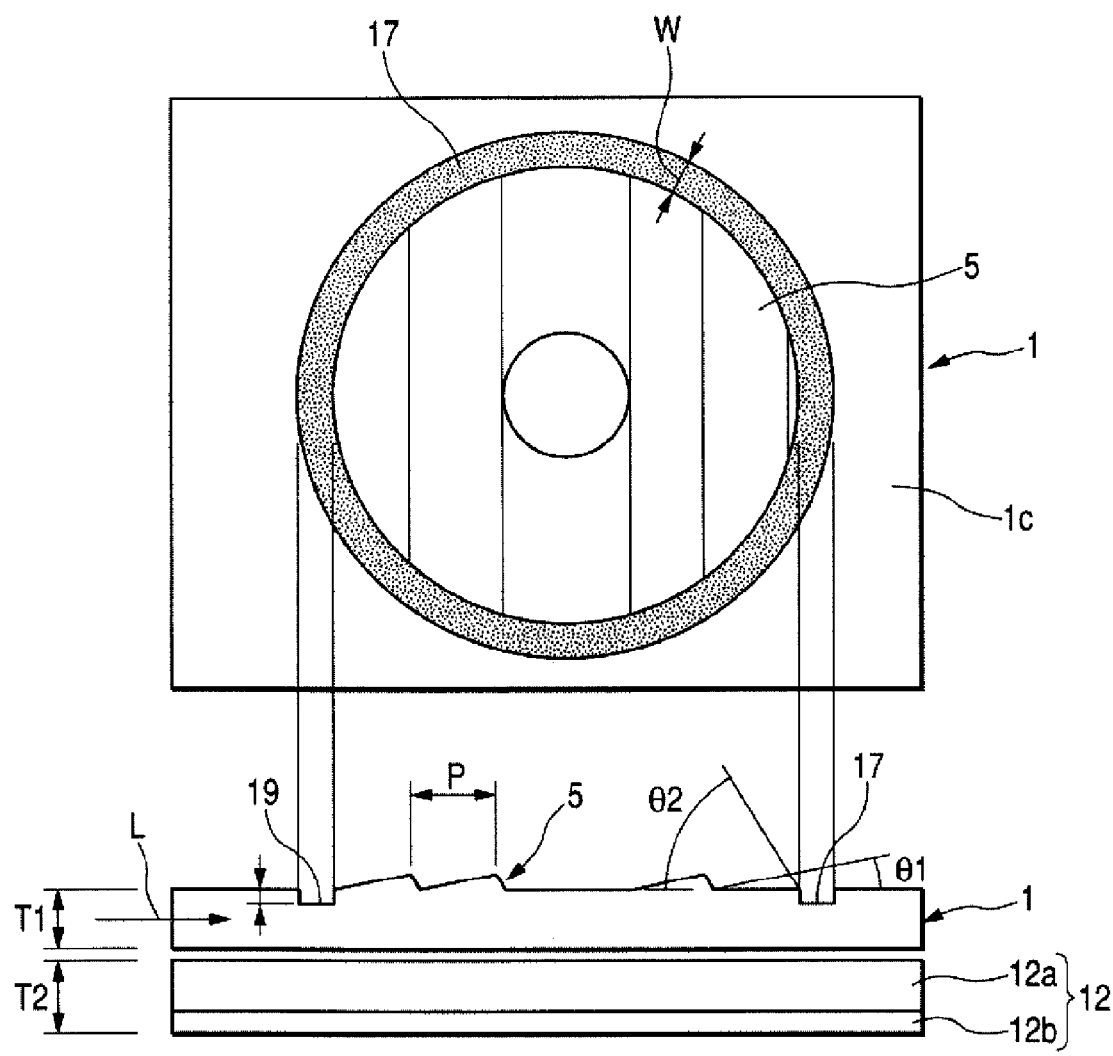
FIG. 12A is a schematic view of a stereoscopic display device according to a modified example to which concrete dimensions are set.
Figure 12B:
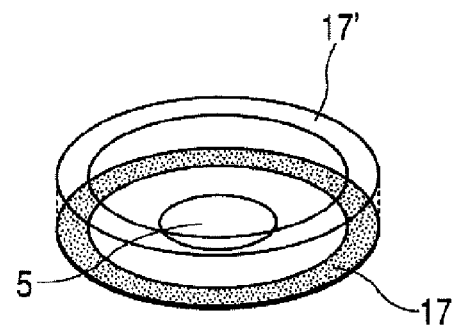
FIG. 12B is a perspective view showing a stereoscopic display in which the real image of the light diffusing part emerges from the virtual image of the plasma.

FIGS. 12A and 12B show a modified example of the first embodiment of the invention. In the modified example, an annular-shaped prism 5, serving as the second light path changing member, is formed at the center of the first main surface 1c of the optical waveguide 1. The light diffusing part 17, which has an annular-shaped groove 19 and serves as the first light path changing member, is formed at the center of the first main surface 1c and surrounds the entire circumference of the prism 5. For example, a pitch P between the scalene triangles of the prisms 5 is set to 416.7 μm, the slope angle (first angle) θ1 of the slightly sloped surface 5a is set to 2.5°, and the slope angle (second angle) θ2 of the steeply sloped surface 5b is set to 35°. For example, the thickness T1 of the optical waveguide 1 is set to 0.8 mm, the thickness T2 of the transparent member 12a of the reflector body 12 is set to 2.0 mm, and the width of the groove of the light diffusing part 17 is set to 0.5 mm.

In the modified example, light that is diffused toward the first main surface 1c by the light diffusing part 17 and emitted from the first main surface 1c is visible by the viewer as a real image formed by light emitted in the circular shape by the light diffusing part 17. Light whose path is changed by the prism 5 travels toward the second main surface 1d and is reflected toward the first main surface 1c by the reflector body 12. Therefore, light is visible by the viewer as a virtual image that appears on the reflector body 12. In one embodiment, the viewer can see the stereoscopic image in which the annular shape (real image 17') of the light diffusing part 17 emerges from the annular shape (virtual image) of the prism 5 (see FIG. 12B).

Figure 13:
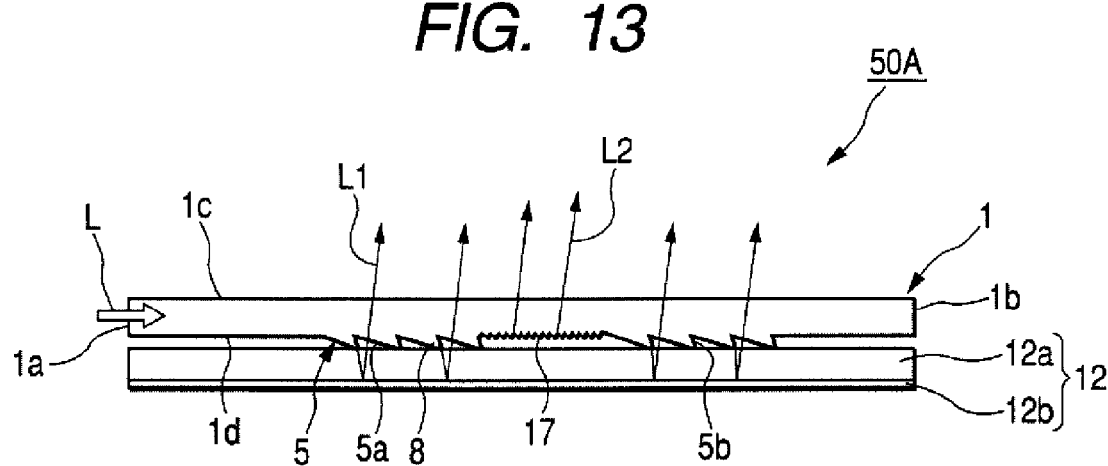
FIG. 13 is a cross-sectional view showing a stereoscopic display device according to a second embodiment.

FIG. 13 shows a stereoscopic display device 50A according to a second embodiment of the invention. As shown in FIG. 13, in the stereoscopic display device 50A according to the second embodiment, a circular-shaped light diffusing part 17, serving as a first light path changing member, is formed at the center of the second main surface 1d of the optical waveguide 1. In one embodiment, a prism 5, serving as a second light path changing member, is concentrically formed on the second main surface 1d so as to enclose the entire circumference of the light diffusing part 17. In this embodiment, the slope direction of the prism 5 is opposite to that of the first embodiment of the invention.

In the stereoscopic display device 50A according to the second embodiment, when the light source 10 is turned on, the path of light L emitted from the light source 10 is changed by the acceptance surface 8 of the steeply sloped surface 5b of the prism S formed on the second main surface 1d of the optical waveguide 1, and the light L is diffused toward the first and second main surfaces 1c and 1d by the light diffusing part 17. The light L1 whose path is changed by the acceptance surface 8 of the steeply sloped surface 5b of the prism 5 is emitted from the second main surface 1d and reflected by the reflective film 12b of the reflector body 12. The light L1 passes through the slightly sloped surface 5a of the prism 5 and is emitted from the first main surface 1c. Light L2 diffused and reflected toward the first main surface 1c by the light diffusing part 17 is emitted from the first main surface 1c without any interference with the reflected light L1.

Similar to the structure shown in FIGS. 5A and 5B, the light L2 that is diffused toward the first main surface 1c by the light diffusing part 17 and emitted from the first main surface 1c is visible by the viewer as a real image formed by light emitted in the circular shape by the light diffusing part 17. The light L1 whose path is changed by the prism 5 is emitted from the second main surface 1d and reflected toward the first main surface 1c by the reflector body 12. The light L1 is visible by the viewer as a virtual image 5' that appears on the reflector body 12. For this reason, the viewer can see the stereoscopic image in which the circular shape of the light diffusing part 17 emerges from the annular shape of the prism 5.

According to the second embodiment, since the prism 5 or the light diffusing part 17 serving as the second light path changing member is not provided on the first main surface 1c exposed to the outside as an emitting surface (the prism 5 or the light diffusing part 17 is provided on only the second main surface 1d that is not exposed to the outside), it is possible to protect the light path changing member from external stress.

Figure 14:
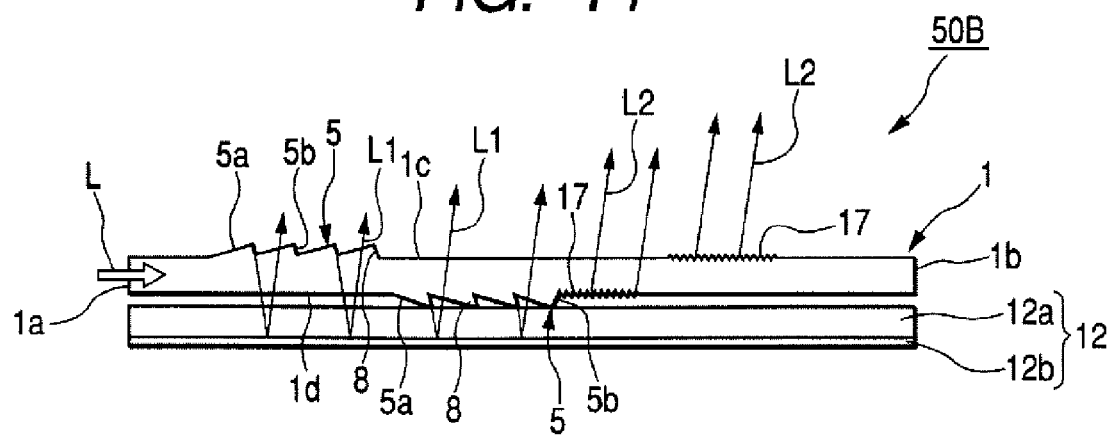
FIG. 14 is a cross-sectional view showing a stereoscopic display device according to a third embodiment.

FIG. 14 shows a stereoscopic display device 50B according to a third embodiment. As shown in FIG. 14, light diffusing parts 17 that have predetermined shapes and serve as first light path changing members are formed on the first and second main surfaces 1c and 1d of the optical waveguide 1 so as not to face each other. Prisms 5 that have predetermined shapes and serve as second light path changing members are formed on the first and second main surfaces 1c and 1d in regions other than the regions where the light path changing members 17 are formed so as not to face each other. In this embodiment, the slope direction of the prism 5 formed on the first main surface 1c is opposite to that of the prism 5 formed on the second main surface 1d.

In the stereoscopic display device 50B according to the third embodiment, when the light source 10 is turned on, the path of light L emitted from the light source 10 is changed by the acceptance-surfaces 8 of the steeply sloped surfaces 5b of the prisms 5 formed on the first and second main surfaces 1c and 1d of the optical waveguide 1, and the light L is diffused toward the first and second main surfaces 1c and 1d by the light diffusing part 17. The light L1 whose path is changed by the acceptance surfaces 8 of the steeply sloped surfaces 5b of the prisms 5 is emitted from the second main surface 1d and reflected by the reflective film 12b of the reflector body 12. The light L1 passes through the slightly sloped surface 5a of the prism 5 and is emitted from the first main surface 1c. Light L2 diffused and reflected toward the first main surface 1c by the light diffusing parts 17, which are formed on the first and second main surfaces 1c and 1d, is emitted from the first main surface 1c without any interference with the reflected light L1.

In the third embodiment, the light L2 that is diffused toward the first main surface 1c by the light diffusing parts 17 and emitted from the first main surface 1c is visible by the viewer as a real image formed by light emits in the shape by the light diffusing part 17. The light L1 whose path is changed by the prisms 5 is emitted from the second main surface 1d and is reflected toward the first main surface 1c by the reflector body 12. Therefore, the light L1 is visible by the viewer as a virtual image that appears on the reflector body 12. The viewer can see the stereoscopic image in which the shape of the light diffusing parts 17 emerges from the shape of the prisms 5. According to the third embodiment, since light is emitted from four different layers, the design property is dramatically improved.

Figure 15:
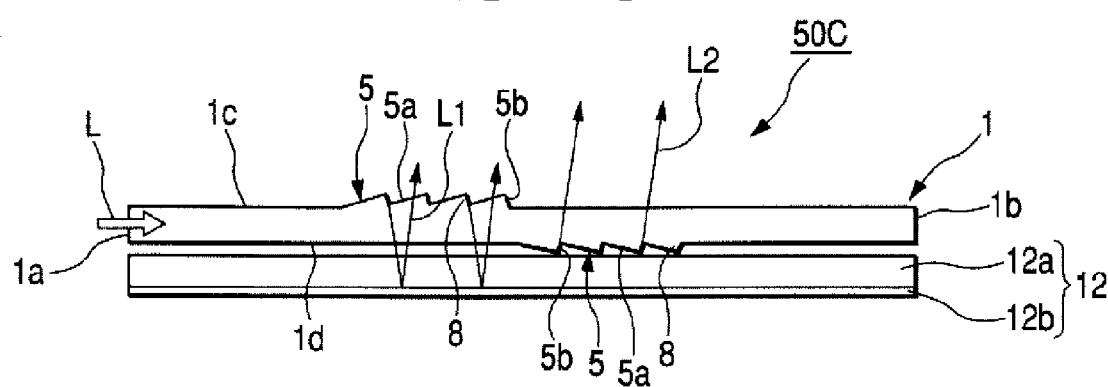
FIG. 15 is a cross-sectional view showing a stereoscopic display device according to a fourth embodiment.

FIG. 15 shows a stereoscopic display device 50C according to a fourth embodiment. As shown in FIG. 15, a prism 5, serving as a first light path changing member, is formed on the second main surface 1d of the optical waveguide 1 so as to have a predetermined shape. A prism 5 that has a predetermined shape and serves as a second light path changing member is formed on the first main surface 1c so as not to be opposite to the prism 5 formed on the second main surface 1d. In this embodiment, the slope direction of the prism 5 formed on the first main surface 1c is opposite to that of the prism 5 formed on the second main surface 1d.

In the stereoscopic display device 50C according to fourth embodiment, when the light source 10 is turned on, the path of light L emitted from the light source 10 is changed to the second main surface 1d by the acceptance surface 8 of the steeply sloped surface 5b of the prism 5 formed on the first main surface 1c of the optical waveguide 1. At the same time, for example, the path of the light L is changed to the first main surface 1c by the acceptance surface 8 of the steeply sloped surface 5b of the prism 5 formed on the second main surface 1d of the optical waveguide 1. For example, the light L1 whose path is changed by the acceptance surface 8 of the steeply sloped surface 5b of the prism 5 formed on the first main surface 1c is emitted from the second main surface 1d and reflected by the reflective film 12b of the reflector body 12. The light L1 passes through the slightly sloped surface 5a of the prism 5 and is emitted from the first main surface 1c. Light L2 whose path is changed by the acceptance surface 8 of the steeply sloped surface 5b of the prism 5 formed on the second main surface 1d is directly emitted from the first main surface 1c without any interference with the reflected light L1.

In the fourth embodiment, the light L2 that is reflected by the prism 5 formed on the second main surface 1d and directly emitted from the first main surface 1c is visible by the viewer as a real image formed by light emitted in the shape of the prism 5. The light L1 whose path is changed by the prism 5 formed on the first main surface 1c is emitted from the second main surface 1d and reflected toward the first main surface 1c by the reflector body 12. Therefore, the light L1 is visible by the viewer as a virtual image that appears on the reflector body 12. The viewer can see the stereoscopic image in which the shape of the prism 5 formed on the second main surface 1d emerges from the shape of the prism 5 formed on the first main surface 1c.

According to the fourth embodiment, since the light diffusing part 17 is not provided, the optical waveguide member 1 is entirely transparent when light is not emitted, and thus the design property is improved.

As described above, according to the stereoscopic display devices 50, 50A, 50B, and 50C of the above-described embodiments and the modified example, the viewer can see the stereoscopic image in which the shape (real image) of the first light path changing member emerges from the shape (virtual image) of the second light path changing member. Accordingly, the viewer can realize a light emitting display having an abundant design property.

In at least one of the embodiments, the stereoscopic display devices 50, 50A, 50B, and 50C of the above-described embodiments and the modified example, the prism 5 has an uneven portion, such as a substantially scalene triangle having the slightly sloped surface 5a and the steeply sloped surface 5b as two sides, and changes the path of light incident on the steeply sloped surface 5b from the light source. The prism 5 can effectively guide light from the light source into the optical waveguide 1 by the slightly sloped surface 5a, and effectively change the path of the guided light by the steeply sloped surface 5b. The prism 5 can transmit light substantially in a normal direction by the slightly sloped surface 5a. In one embodiment, it is possible to easily and reliably display an image formed by light emitted from a complicated and minute prism.

In one embodiment, the emission angle $\theta$ of light which is reflected from the prism 5 by the reflector body 12 and emitted from the first main surface 1c with respect to the first main surface 1c is controlled by the slope angle $\theta2$ of the steeply sloped surface 5b. In this embodiment, it is possible to change the emission angle $\theta$ of light by only changing the slope angle $\theta2$ of the steeply sloped surface 5b, and to easily adjust the stereoscopic effect or the luminance.

In one embodiment, the slightly sloped surface 5a of the prism 5 is set at a slope angle capable of transmitting the light reflected by the reflector body 12. The slightly sloped surface 5a reliably transmits light substantially in the normal direction. Therefore, even when light reflected from the prism 5 is re-reflected toward the prism 5 by the reflector body 12, it is possible to prevent the light emitting performance of the prism 5 from being influenced by the prism 5. Accordingly, the complicated and minute light emitting display of the prism 5 is easy and clear.

In one embodiment, the light diffusing part 17 is formed by providing the grooves and protrusions on the main surfaces 1c and 1d. Alternatively, the light diffusing part 17 is formed by processing a part of the main surfaces 1c and 1d as a pear-skin surface. The light diffusing part 17 can be easily formed on the main surfaces 1c and 1d of the optical waveguide 1, and effectively and uniformly diffuse light.

In one embodiment, the stereoscopic display device 50, 50A, 50B, or 50C having the above-described configuration may be assembled into an input device, such as a touch panel, to realize a flat input device having the stereoscopic effect.

Numeral values or materials described in the first to fourth embodiments of the invention are not limited.

In one embodiment, a stereoscopic display device includes an optical waveguide member that has an end surface on which light emitted from a light source is incident and a pair of first and second main surfaces facing each other. A first light path changing member is provided on at least one of the first and second main surfaces of the optical waveguide member and changes the path of light guided by the optical waveguide member so as to travel toward the first main surface. A second light path changing member is provided on at least one of the first and second main surfaces of the optical waveguide member and changes the path of the light guided by the optical waveguide member so as to travel toward the second main surface. A reflector body is disposed so as to face the second main surface and reflects the light emitted from the second light path changing member to the first main surface. Accordingly, the stereoscopic display device can realize a stereoscopic display having abundant design property by using the optical waveguide member.

Various embodiments described herein can be used alone or in combination with one another. The forgoing detailed description has described only a few of the many possible implementations of the present invention. For this reason, this detailed description is intended by way of illustration, and not by way of limitation. It is only the following claims, including all equivalents that are intended to define the scope of this invention.

The invention claimed is:

1. A stereoscopic display device comprising:
   an optical waveguide member that has an end surface on which light emitted from a light source is incident;
   a first main surface and a second main surface, the first and second main surfaces face each other;
   a first light path changing member that is provided on at least one of the first and second main surfaces, and being operative to change the path of light guided by the optical waveguide member;
   a second light path changing member that is provided on at least one of the first and second main surfaces, and being operative to change the path of the light guided by the optical waveguide member; and
   a reflector body that is disposed so as to face the second main surface and reflects the light emitted from the second light path changing member to the first main surface,
   wherein the first light path changing member is provided on the first main surface and is formed of a light diffusing part that diffuses light guided by the optical waveguide member, and
   the second light path changing member is provided on the first main surface and is formed of a prism that changes the path of the light guided by the optical waveguide member so as to travel toward the second main surface.

2. The stereoscopic display device according to claim 1, wherein a plurality of first and second light path changing members are provided,
   wherein the first light path changing members are provided on both the first and second main surfaces and are formed of light diffusing parts that diffuse the light guided by the optical waveguide member, and
   the second light path changing members are provided on both the first and second main surfaces and are formed of prisms that change the path of the light guided by the optical waveguide member so as to travel toward the second main surface.

3. The stereoscopic display device according to claim 1,
   wherein the first light path changing member is provided on the second main surface and is formed of a prism that changes the path of the light guided by the optical waveguide member so as to travel toward the first main surface, and
   the second light path changing member is provided on the first main surface and is formed of a prism that changes the path of the light guided by the optical waveguide member so as to travel toward the second main surface.

4. The stereoscopic display device according to claim 1,
   wherein the prism has an uneven portion composed of a substantially scalene triangle having a first sloped surface that is slanted at a first angle with respect to the main surface and a second sloped surface that is slanted at a second angle with respect to the main surface,
   the second angle is larger than the first angle, and
   the path of the light emitted from the light source is changed by the second sloped surface of the prism.

5. The stereoscopic display device according to claim 4,
   wherein an emission angle of light that is reflected by the reflector body and emitted from the first main surface with respect to the first main surface is controlled by the second angle of the second sloped surface.

6. The stereoscopic display device according to claim 5,
   wherein the emission angle is set in a range of about 5° to 45°.

7. The stereoscopic display device according to claim 6,
   wherein the second angle of the second sloped surface is set in a range of about 33° to 43°.

8. The stereoscopic display device according to claim 4,
   wherein the first sloped surface of the prism is slanted at an angle capable of transmitting the light reflected from the reflector body.

9. The stereoscopic display device according to claim 1,
   wherein the light diffusing part is formed by providing grooves or protrusions on the main surface.

10. The stereoscopic display device according to claim 1,
    wherein the light diffusing part is formed by processing a part of the first main surface as a pear-skin surface.

11. The stereoscopic display device according to claim 2,
    wherein the prisms have an uneven portion composed of a substantially scalene triangle having a first sloped surface that is slanted at a first angle with respect to the main surface and a second sloped surface that is slanted at a second angle with respect to the main surface,
    the second angle is larger than the first angle, and
    the path of the light emitted from the light source is changed by the second sloped surface of the prism.

12. The stereoscopic display device according to claim 11,
    wherein an emission angle of light that is reflected by the reflector body and emitted from the first main surface with respect to the first main surface is controlled by the second angle of the second sloped surface.

13. The stereoscopic display device according to claim 11,
    wherein the emission angle is set in a range of about 5° to 45°.

14. The stereoscopic display device according to claim 13,
    wherein the second angle of the second sloped surface is set in a range of about 33° to 43°.

15. The stereoscopic display device according to claim 11,
    wherein the first sloped surface of the prism is slanted at an angle capable of transmitting the light reflected from the reflector body.

16. The stereoscopic display device according to claim 11, wherein the light diffusing part is formed by providing grooves or protrusions on the main surface.

17. The stereoscopic display device according to claim 11, wherein the light diffusing part is formed by processing a part of the first main surface as a pear-skin surface.

18. The stereoscopic display device according to claim 11, wherein the first light path changing member changes the path of light guided by the optical waveguide member so as to travel toward the first main surface; and
wherein the second light path changing member changes the path of the light guided by the optical waveguide member so as to travel toward the second main surface.

19. A stereoscopic display device comprising:
an optical waveguide member that has an end surface on which light emitted from a light source is incident;
a first main surface and a second main surface, the first and second main surfaces face each other;
a first light path changing member that is provided on at least one of the first and second main surfaces, and being operative to change the path of light guided by the optical waveguide member;
a second light path changing member that is provided on at least one of the first and second main surfaces, and being operative to change the path of the light guided by the optical waveguide member; and
a reflector body that is disposed so as to face the second main surface and reflects the light emitted from the second light path changing member to the first main surface,
wherein the first light path changing member is provided on the second main surface and is formed of a light diffusing part that diffuses the light guided by the optical waveguide member, and
the second light path changing member is provided on the second main surface and is formed of a prism that changes the path of the light guided by the optical waveguide member so as to travel toward the second main surface.

20. A stereoscopic display device comprising:
an optical waveguide member that has an end surface on which light emitted from a light source is incident;
a first main surface and a second main surface, the first and second main surfaces face each other;
a first light path changing member that is provided on at least one of the first and second main surfaces, and being operative to change the path of light guided by the optical waveguide member;
a second light path changing member that is provided on at least one of the first and second main surfaces, and being operative to change the path of the light guided by the optical waveguide member; and
a reflector body that is disposed so as to face the second main surface and reflects the light emitted from the second light path changing member to the first main surface,
wherein, the first light path changing member is offset from the second light path changing member, as viewed from a vertical direction being substantially perpendicular to the reflector body.

* * * * *